United States Patent [19]
Moon et al.

[11] Patent Number: 6,157,954
[45] Date of Patent: Dec. 5, 2000

[54] COMMUNICATION CONTROL DEVICE INCLUDING BUSINESS CARD DATABASE WITH ASSOCIATED BUSINESS CARD AGENTS FOR CONTROLLING COMMUNICATED ELECTRONIC MAIL BETWEEN USER AND CARD PROVIDER

[75] Inventors: Billy G. Moon, Apex; Tammy A. Wooldridge, Raleigh, both of N.C.

[73] Assignee: Ericsson Inc., Research Triangle Park, N.C.

[21] Appl. No.: 08/939,828

[22] Filed: Sep. 29, 1997

[51] Int. Cl.$^7$ ...................................................... G06F 15/16
[52] U.S. Cl. ......................... 709/228; 709/201; 709/206; 709/217; 709/218; 709/227; 709/232; 707/10; 379/219; 379/243; 379/258; 379/372
[58] Field of Search ..................................... 709/201, 206, 709/218, 245, 303, 26, 217, 227, 228; 707/10; 345/334; 358/400; 379/219, 243, 258, 372

[56] References Cited

U.S. PATENT DOCUMENTS

| | | | |
|---|---|---|---|
| 5,303,343 | 4/1994 | Ohya et al. | 709/246 |
| 5,513,126 | 4/1996 | Harkins et al. | 709/22 |
| 5,732,229 | 3/1998 | Dickinson | 345/334 |
| 5,754,306 | 5/1998 | Taylor et al. | 358/400 |
| 5,826,039 | 10/1998 | Jones | 709/206 |
| 5,862,325 | 1/1999 | Reed et al. | 709/201 |
| 6,088,696 | 7/2000 | Moon et al. | 707/10 |

FOREIGN PATENT DOCUMENTS

WO94/17480   8/1994   WIPO .

OTHER PUBLICATIONS

Hanckmann, Jr.: "Telescript: The Emerging Standard for Intelligent Messaging", *Phillips Telecommunication Review*, vol. 52, No. 1, Mar. 1, 1994, pp. 15–19.

"Methodology For Mail Delivery In A Multi–Media Environment", *IBM Technical Disclosure Bulletin*, vol. 36, No. 4, Apr. 1, 1993, pp. 507–508.

"Preferred Media Communication Establishment Mechanism", *IBM Technical Disclosure Bulletin*, vol. 37, No. 3, Mar. 1, 1994, p. 169/170.

Suchun Wu: "MHS Security—A Concise Survey", *Computer Networks and ISDN Systems*, vol. 25, No. 4/05, Nov. 1, 1992.

"OS/2 Office: Delayed Delivery for Mail Items", *IBM Technical Disclosure Bulletin*, vol. 34, No. 9, Feb. 1, 1992, pp. 381–382.

Salamone, S.: "Delivering E–Mail For The Enterprise Five Apis Vie To Control The Link Between Applications and Transport Mechanisms", *Data Communications*, vol. 21, No. 18, Dec. 1, 1992, pp. 49–50.

*Primary Examiner*—Meng-Ai T. An
*Assistant Examiner*—Nabil El-Hady
*Attorney, Agent, or Firm*—Wood, Phillips, VanSanten, Clark & Mortimer

[57] ABSTRACT

A communication control software application is used in a user communication device having a processor and associated memory. The processor controls a display and a user input device. A communications terminal transmits and receives electronic mail. The communication control software application includes a phone application stored in the memory, the phone application including a business card database storing plural business cards. Each business card identifies characteristics of a particular card provider who electronic mail is to be sent to or received from. One or more of the business cards includes an associated business card agent defined by an agent software routine controlling how electronic mail is communicated between the user and the particular provider. A messaging application initiates communications to transmit or receive electronic mail. The phone application and the messaging application determining if a business card agent is associated with a business card of a provider to whom electronic mail is to be sent or is received from by the phone dialer application, and in response thereto implement the agent software routine to control how the electronic mail is communicated.

22 Claims, 7 Drawing Sheets

Fig. 5

```
Personal Phone Data
              Home              Work
Phone #      [        ]       [        ]
FAX #        [        ]       [        ]
Cell Phone # [        ]       [        ]
Pager #      [        ]       [        ]

[ Back ]    [ Cancel ]    [ Next ]
```

Fig. 6

```
E-Mail Data
                   E-Mail
      Home                   Work
    [        ]             [        ]
                    URL
      Home                   Work
    [        ]             [        ]

[ Back ]    [ Cancel ]    [ Next ]
```

Fig. 7

```
Personal E-Mail Data
   Name        Number         Su M Tu W Th F Sa
 [       ]   [       ]   08:00              ⇧
                         09:00
                         10:00
                         11:00              ⇩

[ Back ]    [ Cancel ]    [ Next ]
```

Fig. 10a

| USER | PHONE DIALER | BUSINESS CARD | SERVICE PROVIDER |
|---|---|---|---|
| USER WANTS TO FIND A LOCAL FAST FOOD RESTAURANT THEREFORE HE SELECTS THE TELEPHONE DIALER APPLICATION AND CLICKS ON DIALER, THEN SELECTS THE PHONE BOOK KEYBOARD | | | |
| | ALL USER PHONE BOOKS ARE DISPLAYED, INCLUDING YELLOW PAGES | | |
| USER SELECTS THE YELLOW PAGES PHONE BOOK | | | |
| | A PBMS CARD IS LISTED IN THE YELLOW PAGES | | |
| USER SELECTS THE PBMS CARD BY CLICKING ON IT | | | |
| | THE PHONE DIALER ASKS THE PBMS BUSINESS CARD IF IT IS A CONSULTING CARD AND IT IS, THEREFORE THE PHONE DIALER ASKS THE CARD FOR IT'S CONSULTING PANEL | | |

Fig. 10b

| | | | | |
|---|---|---|---|---|
| | | THE CARD RETURNS A PANEL THAT ALLOWS THE USER TO ENTER SEARCH CRITERIA SIMILAR TO THE "YELLOW PAGES" PHONE BOOK, I.E. SUBJECT, THE ALPHABETICAL LISTINGS AND HIGH PROFILE ADDS | | |
| THE USER SELECTS THE RESTAURANT DIRECTORY | | | | |
| | | THE CARD CONNECTS TO THE SERVICE PROVIDER AND REQUESTS THE RESTAURANT DATA BASE | | |
| | | | CURRENT RESTAURANT DATA BASE IS RETURNED | |
| | | DISPLAY THE DATA BASE | | |
| USER SELECTS FAST FOOD | | | | |
| | | THE CARD ASKS THE SERVICE PROVIDER FOR FAST FOOD SUB-TOPIC | | |
| | | | FAST FOOD LISTINGS ARE RETURNED | |
| | | LISTINGS ARE SHOWN | | |

| USER SELECTS "PIZZA" AND THEN PRESSES THE PHONE DIALER'S CALL BUTTON | | | |
|---|---|---|---|
| | THE PHONE DIALER ASKS THE CARD FOR THE "PIZZA" TELEPHONE NUMBER | | |
| | | TELEPHONE NUMBER IS RETURNED | |
| | NUMBER IS DIALED AND CALL ENSUES | | |
| ETC. | ETC. | ETC. | ETC. |

COMMUNICATION CONTROL DEVICE INCLUDING BUSINESS CARD DATABASE WITH ASSOCIATED BUSINESS CARD AGENTS FOR CONTROLLING COMMUNICATED ELECTRONIC MAIL BETWEEN USER AND CARD PROVIDER

FIELD OF THE INVENTION

This invention relates to business communication systems and, more particularly, to use of business card agents and applications that provide security and intelligence in business interactions.

BACKGROUND OF THE INVENTION

A new type of business communicator is proposed that has a full computer with integrated communication capability. The communicator is intended to fill all of the communications needs of a traveling business person (TBP). To better serve the TBP, a system developed around use of a business card agent (BCA) and supporting applications are used.

Data communications conducted with the communicator are done on the Internet. The Internet is an open environment which invites either deliberate electronic espionage or casual snooping. There are many well-documented cases of information being monitored and used within the environment. The use of encrypted mail based on public/private key pairs is typically used to secure communications over the Internet. However, there must be some mechanism to exchange the public key portion of the message. This exposure can lead to holes in the security. Also, once a key pair is exchanged there is no simple way to administer those keys. If they are changed, lost, or a known recipient begins working for a competitor, then there is no simple way to change the keys for the numerous other contacts using the key pair.

Most business cards do not include intelligence to allow others to contact the business card provider in a manner that is most convenient to the provider, rather than the sender. Instead, the sender makes the choice of when and where to contact the business card provider regardless of convenience factors. For example, if the business card provider is at a different location, then the information being transferred could be outdated before the business card provider receives it.

As Internet use becomes more common, it becomes ever more difficult to maintain lists of names and contacts. Also, there are occasions when a directory service is invaluable to look up not only E-mail addresses, but also business addresses, telephone numbers, etc. While various directory services are available, such as directory assistance or Internet White Pages, these services typically have databases that are out of date. CD-ROM software is also available. Again, this information is often outdated.

Finally, to fill all the communication needs it is desirable that a system allow consultants to publish business card agents to be used by the TBP to order consulting services.

The present invention is directed to overcoming one or more of the problems discussed above in a novel and simple manner.

SUMMARY OF THE INVENTION

In accordance with the invention there is provided a user communication device including a business card agent controlling how electronic mail is communicated.

Broadly, there is disclosed herein a communication control software application in a user communication device having a processor and associated memory. The processor controls a display and a user input device. A communications terminal transmits and receives electronic mail. The communication control software application includes a phone application stored in the memory, the phone application including a business card database storing plural business cards. Each business card identifies characteristics of a particular card provider who electronic mail is to be sent to or received from. One or more of the business cards includes an associated business card agent defined by an agent software routine controlling how electronic mail is communicated between the user and the particular provider. A messaging application initiates communications to transmit or receive electronic mail. Control means are operatively associated with the phone application and the messaging application for determining if a business card agent is associated with a business card of a provider to whom electronic mail is to be sent or from whom electronic mail is received by the messaging application, and in response thereto implementing the agent software routine to control how the electronic mail is communicated.

It is a feature of the invention that the characteristics of the card provider include one or more fax numbers and/or E-mail addresses and the agent software routine automatically selects one of the fax numbers or E-mail addresses for the control means according to time or date that electronic mail is to be sent to the particular provider. The control means includes means for permitting the user to override the automatic selection.

It is a further feature of the invention that the agent software routine comprises a private encryption routine and the control means encrypts each message to the particular provider using the private encryption routine prior to transmission via the messaging application.

It is an additional feature of the invention that the agent software routine comprises a private decryption routine and the control means decrypts each message from the particular provider using the private decryption routine after receipt from the messaging application.

It is another feature of the invention that the agent software routine selects time of day or date that electronic mail is to be sent to the particular provider.

It is yet another feature of the invention that the provider characteristics include a network address for the particular provider and the agent software routine is adapted to automatically retrieve select information from the network address. The control means implements the agent software routine to retrieve the select information from the network address when communication is initiated by the phone dialer application. The select information is stored in the business card.

It is still a further feature of the invention that the agent software routine further includes a user display control panel accessible by select other software applications in the user communication device and the control means implements the agent software routine using the display control panel to control communications of electronic mail from the other software applications. The display control panel comprises a display menu to be filled in by the user and then transmitted to the card provider.

There is disclosed in accordance with another aspect of the invention a method of controlling the receipt or transmission of electronic mail including the steps of: storing a phone application in the memory of the communication device; associating with the phone application a business card database storing plural business cards, each business card identifying characteristics of a particular card provider who electronic mail is to be sent to or received from, one or more of the business cards including an associated business card agent defined by an agent software routine controlling how electronic mail is communicated between the user and the particular provider; initiating communications to transmit or receive electronic mail; and determining if a business card agent is associated with a business card of a provider to whom electronic mail is to be sent or to whom electronic mail is received from, and in response thereto implementing the agent software routine to control how the electronic mail is communicated.

Further features and advantages of the invention will be readily apparent from the specification and from the drawings.

BRIEF DESCRIPTION OF THE DRAWINGS

FIGS. 5, 6 and 7 are screen displays used for entering or editing personal data associated with a business card;

DETAILED DESCRIPTION OF THE INVENTION

Figure 1:
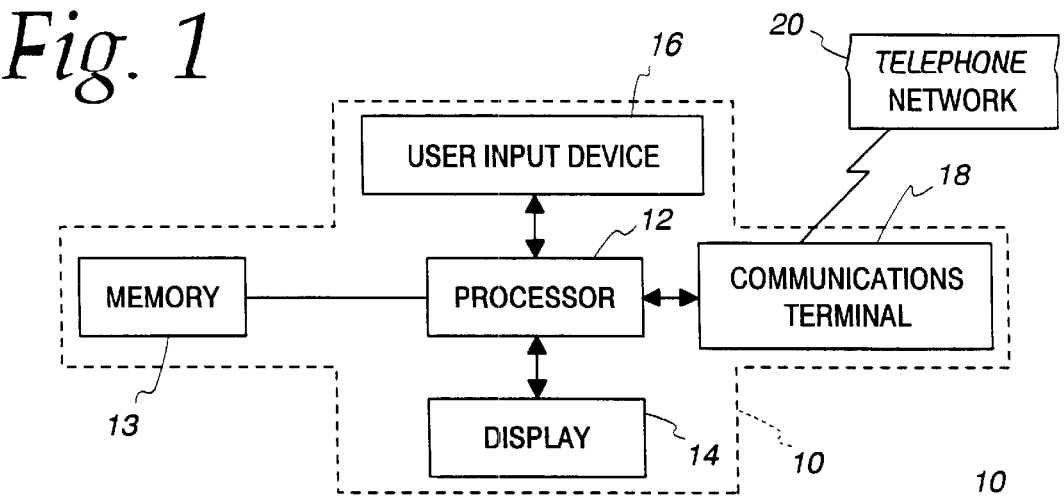
FIG. 1 is a block diagram of the user communication device utilizing business card agents and applications of the present invention.

With reference initially to FIG. 1, a user communication device 10 using business card agents and applications according to the invention is illustrated. The user communication device 10 includes a processor 12 connected to an associated memory 13. The processor 12 is also connected to a display 14 and user input device 16. The communications terminal 18 is connected to the processor 12 for communicating externally, for telephonic communications via a telephone network 20. Essentially, the device 10 is a business communicator having a full computer with integrated communications. The device could consist of, for example, an intelligent cellular phone with expanded user interface or a desktop computer connected to a modem. The communicator 10 is intended to fill all of the communication needs of a travelling business person (TBP). Particularly, a system architected around a business card agent (BCA) is included that provides security and intelligence in the interactions of a business situation.

The communications terminal 18 is preferably a cellular modem, or its functional equivalent, but may also include a standard modem for connection to a public switched telephone network ("PSTN"). Accordingly, the telephone network 20 is preferably a cellular network, but may also include a PSTN.

The processor 12 operates in accordance with applications and data stored in the memory 13. In the illustrated embodiment of the invention, all applications are written in an object-oriented language, such as Java. The applications can therefore borrow whole sections of code from each other.

Figure 2:
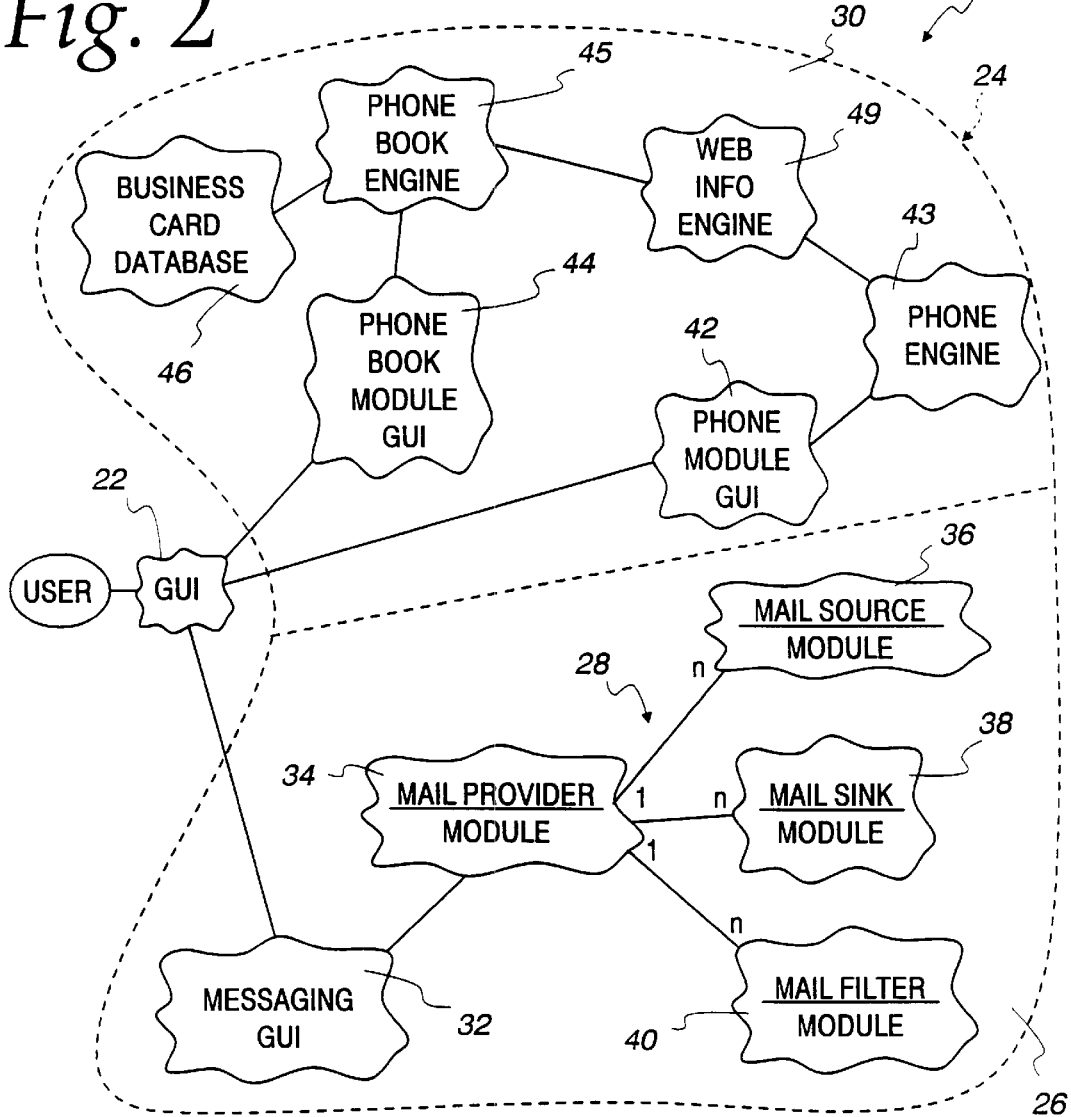
FIG. 2 is a block diagram illustrating software architecture in the user communication device of FIG. 1.

Referring to FIG. 2, the software architecture for the communicator 10 is illustrated. The software includes a basic graphic user interface (GUI) 22 and applications 24. The GUI 22 provides control panels, menus and the like for the display 14, see FIG. 1, for entering input information on the user input device 16.

The applications 24 are the software programs that provide the functionality of the communicator 10. The GUI 22 controls how the user opens and closes applications and allows the user to configure personal preferences.

In the illustrated embodiment of the invention, the applications 24 include a messaging application 26 and a phone application 30. The messaging application 26 allows the user to read and create E-mail, faxes and voice mail messages, referred to generically herein as electronic mail. The phone application 30 allows the communicator 10 to be used as a phone and has both textual and vocal input. The phone application 30 is also an address book that stores pertinent information about context.

More particularly, the messaging application 26 includes a messaging GUI 32 for providing control panels which allows a user to send or receive mail in the form of E-mail, fax mail, and voice mail. The user can set up filters and schedule delivery time for mail. The user can receive notification when a new piece of mail has arrived and when mail is delivered to a destination. A messaging engine 28 provides the routines to control the messaging GUI 32. The messaging engine 28 includes a mail provider module 34 communicating with the messaging GUI 32. A mail source module 36 is operatively associated with the mail provider module 34 for receiving of electronic messages. A mail sink module 38 is operatively associated with the mail provider module 34 for transmitting of messages. A mail filter module 40 is operatively associated with the mail provider module 34 for providing appropriate filters, such as for encryption or decryption, to received mail or mail to be transmitted.

The phone application 30 includes a phone module GUI 42 and a phone book module GUI 44. These control user interaction. A phone book engine 45 provides the routines to control the phone book module GUI 44. The phone book engine 45 is connected to a business card database 46. The business card database 46 stores plural electronic business cards. An electronic business card is a record of information for a particular provider, such as an individual or business. It identifies characteristics of the provider, such as name, addresses, pertinent phone numbers, etc. The phone book module GUI 44 provides a user-friendly environment for accessing business cards in the business card database. A phone engine 43 provides the routines to control the phone module GUI 42 and is operable to provide phone connection to connect, for example, to Internet sites via the communications terminal 18 and telephone network 20, see FIG. 1. A Web information engine 49 is connected to the phone book engine 45 and the phone engine 43 to scrape requested information off of an Internet site, as discussed below.

Figure 3:
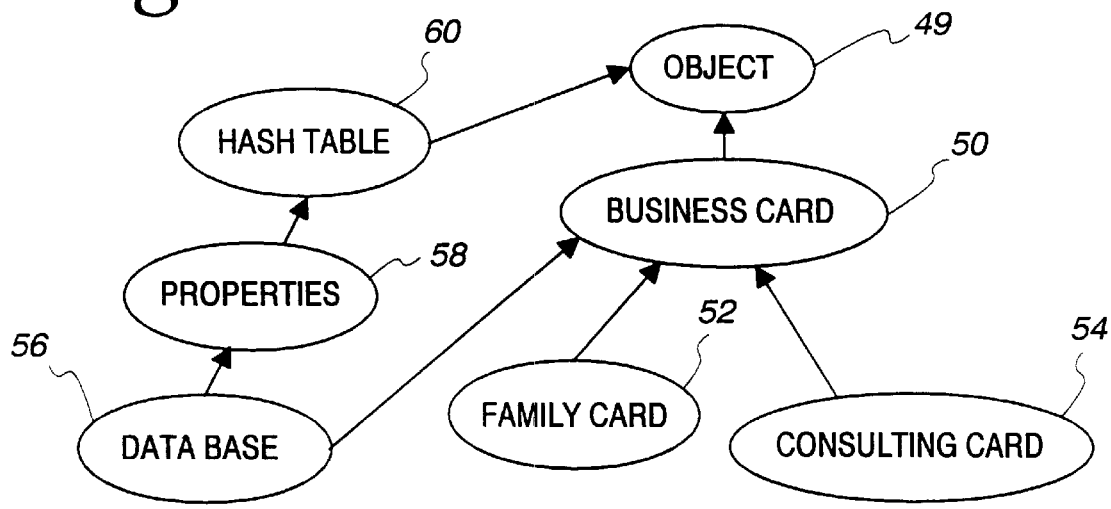
FIG. 3 is a Booch diagram representation of the business card agent.

In accordance with the invention, the communicator 10 provides for business card agent (BCA) technology. A BCA is a special object in the system that represents the wishes and desires of its provider. The BCA represents its provider to its host system and participates in decisions regarding its provider. FIG. 3 illustrates a Booch diagram for this object 49. The BCA is either an instance of the business card super class (BusinessCard) 50 or derived from this super class. For the latter, the BCA might be an instance of the FamilyCard class 52 or the ConsultingCard class 54.

As is well known, the Booch diagram of FIG. 3 represents that the BusinessCard class 50 is an object contained in a database 56 having properties 58 and having records and fields in the hash table 60 formatted and all derived from the object 49.

Figure 4:
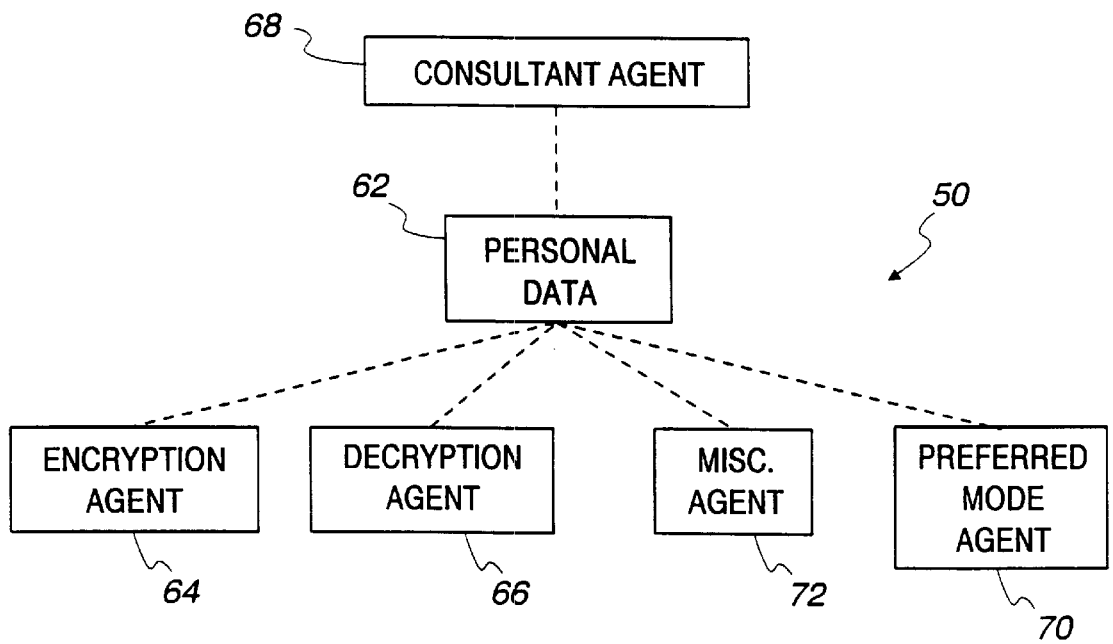
FIG. 4 is a block diagram illustrating information and agents operatively associated with a business card.

The business card instances all have a set of object-oriented methods that provide an expected action. How that action is carried out is dependent on the needs of the business card instance. The following methods are required:

displayBusinessCard()—displays the contents of the card in the format desired encryptDocument(Document)—encrypts and returns the passed in Document decryptDocument(Document)—decrypts and returns the passed in Document isConsultant()—returns true if card is a ConsultingCard, false if not setupConsultant()—returns a Container holding the consultant card for the BCA getPreferredAddress()—returns the address that is preferred by the provider of the BCA based on the system time at the time the request is being made to communicate Referring now to FIG. 4, a block diagram illustrates a typical business card and associated BCA's associated with the business card database 46 of FIG. 2. Each business card 50 includes a block 62 storing the identifying characteristics or personal data, such as name, address, phone numbers and the like. In this respect, the electronic business card 50 is similar to a typical paper-type business card. In accordance with the invention, the business card 50 also includes one or more BCAs, such as an encryption agent 64, a decryption agent 66, a consultant agent 68, a preferred mode agent 70 and other miscellaneous agents 72. An agent is written in Java code and is defined by a software routine controlling how electronic mail is communicated to or from the provider. For example, the encryption agent 64 includes a private key or routine for encrypting messages to be sent to the business card provider. Likewise, the decryption agent 66 holds a private key or routine for decrypting messages received from the business card provider. The consultant agent 68 provides customized interaction for various consultant services or the like, as described below. Miscellaneous agents 72 may provide for various functions such as, for example, auto- forwarding of messages.

The preferred mode agent 70 gives the business card provider the ability to choose the time of day and mode of contact most convenient to the provider so as to receive information in a timely manner. Information is stored in the preferred mode agent 70 as defined by the BCA provider using a business card wizard similar to the following. Although not shown, each business card includes personal information, such as name and address and the like. The business card agents are packed within a container and stored in the messaging application 26. FIG. 5 illustrates a screen for entering phone, fax, cell phone and pager numbers, both for home and work. The screen display of FIG. 6 is then used for entering E-mail and Internet addresses, again for both home and work. FIG. 7 illustrates a display used for entering preferences for sending personal E-mail based on time of day. Although not shown, similar displays are used for entering preferences for personal phone data and personal fax data based on time of day.

When a business card is created including a BCA using the above wizard, that business card can then be sent to various users, such as a user of the communicator 10, as by storing it in the business card database 46, see FIG. 2.

Figures 8, 9:
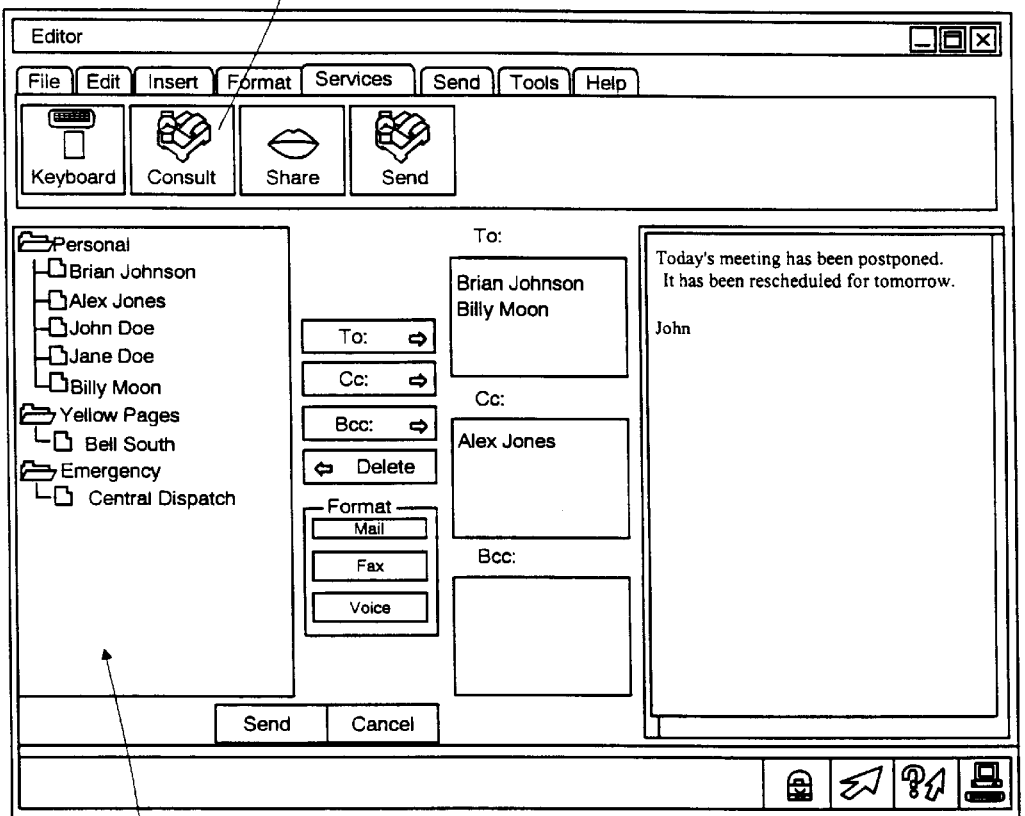
FIG. 8 is a screen display used for selecting preferences for communications on the user communication device of FIG. 1.
FIG. 9 is a screen display of a consulting services panel associated with a business card agent according to the invention.

With a business card stored in the database 46, the user can operate the communicator 10 to send a message with the preferred time and mode being determined by the BCA associated with the provider's business card. The typical session begins with the user creating a document and the making a request to send the document. This may be done in accordance with a display screen such as shown in FIG. 8, referred to as a Send panel. The Send panel includes a list 82 of business cards, separated by phone books. The user can choose the person's business card from the phone book in which to send the mail to. The preferred document type for transmission at the particular time is requested from the preferred mode agent 70, see FIG. 4. The preferred mode of contact for the time the contact is being made is determined by calling the OO method, getPreferredAddress(). If E-mail is the preferred document type, then the application requests the E-mail addresses from the business card. Otherwise, the fax number will be requested. If there are multiple addresses for the preferred document type, such as multiple E-mail addresses, then the user can agree with the preferred address or select another address. The user can also request to send the document via the non-preferred document type by clicking on the appropriate control button. If the document type is E-mail, then the application sends the document to the card provider/receiver's encryption agent 64, which returns an encrypted document. The encrypted document is then sent via the communications terminal 18 in a conventional manner.

Thus, instead of using keys to encrypt and decrypt messages, the messaging application 26 uses the Object Oriented (OO) method call encryptDocument(Document) to the encryption agent 64 to encrypt the message. The opposite applies for the decryption of a received message. Only the message receiver who supplied the OO class would know what was done to encrypt the message and what is needed to decrypt the message. This eliminates the need for exposed keys.

The disclosed software architecture additionally supports the use of consulting services. The system consists of a control selection available to the TBP to access the consulting services system and a special type of business card referred to as a ConsultingCard 54, see FIG. 3.

As discussed above, the object-oriented operating system is based on the Java language. An application super class defines the basic behaviors of an application such as look and feel and layout. Within this super class it is defined that all applications have a control panel. This control panel provides the same functionality as a menu system on a typical desktop application. Unlike a menu system which is a part of an application and contains a fixed set of menu items, the control panel can host any number of arbitrary controls. Controls can thus be added to an application independent of the application development.

Each control may require that a particular interface be supported by the application before it can be attached to that application. In the case of the "consulting" control, the cut, copy, paste interface must be supported by the application before it can be supported. The consulting control uses this interface to obtain a copy of the object the user has selected so that it can be mailed to the consultant provider.

The BCA is further defined through a business card super class from which all business card agents must be derived. This super class providers methods for determining if the business card is a consulting card and if so, for obtaining a consulting services panel. An example of a consulting services panel is shown in FIG. 9, in which a business card is declared as a consulting card and code in the consultant agent 68, see FIG. 4, is provided that allows the user to order 35 millimeter overhead slides for two dollars per slide. The consulting control can be attached, for example, to the word processor application's control panel. The word processor must support the cut, copy, paste interface. (A consulting control 84 is shown in a different application in FIG. 8.) When the user presses the consulting control, a dialog panel lists all consultants in the business card database 46. The user picks "Joe's 35 Millimeter Slides" to order slides. The consulting control asks Joe's consultant agent 68 for its consulting panel, and displays the panel shown in FIG. 9 in a dialog for the user. In addition to this panel, the control presents the user with three choices: Cancel to terminate the consulting order, Haggle to allow the user to haggle over prices before placing an order, or Order. If Haggle is pressed, then the system pops up a window to allow the user to enter either a fixed or a per unit price that must be met in order for the consultant to receive the job. When the job is ordered, then the user's document is obtained through the cut, copy, paste interface method "copy object". The encryption agent 64 is then used to encrypt the document, attach its instructions, i.e., particulars of the order, to the user document, and then mail the document to its provider where the services will be rendered.

Moreover, consulting services can be further expanded by use of the Internet. The consulting card along with an Internet service provider might provide an up-to-date database for directory services. For example, all telephone company/service providers share a common database interface that allows up-to-date information to be maintained through the telecommunications network. Extending this information to the end user through the business card metaphor is a straightforward technical exercise with the use of business card agents.

Figures 10, 10C:
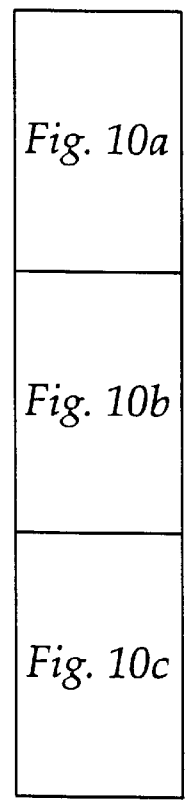
FIG. 10 is a flow chart illustrating a communication session implemented using a business card agent.

As can be appreciated, the particular session depends on the objects to be achieved. An example of a flow chart for a session is illustrated in FIG. 10. A user selects the phone application 30, see FIG. 2, and clicks on a dialer selecting a phone book keyboard. The particular GUI for the phone application 30 is not specifically illustrated herein and may take any known form. The particular form of the GUI is not part of the invention, but rather the ability to use the business card agent in the manner described. The phone book module GUI 44 displays all user phone books, including Yellow Pages, which are selected by the user. A PBMS business card listed in the Yellow pages is then selected by the user by clicking on it. The phone application 30 asks the PBMS business card if it is a consulting card. Since it is, a phone dialer asks the card for its consulting panel. The business card returns a consulting panel that allows the user to enter search criteria similar to the "Yellow Pages" phone book, by subject, alphabetical listings, and high profile ads. The user selects a restaurant directory. The business card using the consultant agent 68, see FIG. 4, connects to the service provider determined by the business card's listed URL and requests the restaurant database. The current restaurant database is returned over the Internet and displayed. The user then selects fast food. The card asks the service provider for the fast food subtopic. The fast food listings are then returned and displayed by the business card. The user selects "pizza" and presses the phone dialer's call button. The phone dialer obtains the pizza telephone number, which is returned and dialed so that a voice call ensues.

A session such as described uses a WATS Internet Descriptor Language (WIDL) to implement the session. The consulted agent 68 goes to the Web page based on the URL and scrapes appropriate information which is passed back to the business card and stored. In order for a user to partake of such services, the user must obtain the business card from the service provider. The business card would identify the pertinent information and include the consultant agent 68 necessary to provide updated information. This type of business card and consultant agent might be used by various service providers to enable a user to quickly and easily obtain updated information about the consultant through the Internet. The updated information is then stored with the business card so that it is readily accessible by the user.

Thus, the use of various business card agents, including a consultant agent, enhances a user's ability to communicate with the business card provider. Particularly, with the preferred mode business card agent 70, the provider selects preferences for receiving electronic mail. Nevertheless, the sender ultimately decides the mode of transmission. The sender can configure the communicator 10 based on a list of preferences. These preferences include always send a message based on the business card preferred mode, based on sender approving the business card preferred mode at the time of sending, or by the user directly selecting the mode.

The consultant agent 68 provides a system that enables directory services based on Internet technologies to be integrated into a business card. The consultant agent 68 represents its provider to its host system and participates in decisions regarding its provider.

The encryption agent 64 and decryption agent 66 provide enhanced security by use of filter agents provided directly by the business card provider. The encryption agent 64 or decryption agent 66 include code to perform the actual encryption or decryption, rather than the use of conventional encryption keys. This is done without knowledge or intervention by the user. Moreover, the business card provider can change the key by simply updating its business card and sending it to various users. Likewise, the user can receive multiple types of mail with different encryption codes.

Finally, the consultant agent 68 can be used by the TBP to order consulting services. For example, a TBP may receive a memo written in Swedish, while the TBP only speaks English. This company may have set up an internal translation service for Swedish-to-English or English-to-Swedish and placed a consulting card on the TBP's communicator 10. The TBP can now order this consulting service and have the memo translated as needed. In other examples, outside services such as the creation of graphics, or production of overhead slides, or even travel services can be supported by the same consulting service's architecture.

Thus, the invention broadly relates to the use of business card agents and applications to improve communication ability of a user thereof.

We claim:

1. In a user communication device having a processor and associated memory, the processor controlling a display and a user input device, and a communications terminal for transmitting and receiving electronic mail, a communication control software application comprising:

a phone application stored in the memory of the communication device, the phone application including a business card database storing plural business cards, each business card identifying characteristics of a particular card provider whom electronic mail is to be sent to or received from, one or more of the business cards including an associated business card agent defined by an agent software routine controlling how electronic mail is communicated between the user and the particular provider;

a messaging application for initiating communications to transmit or receive electronic mail; and control means operatively associated with the phone application and the messaging application for determining if a business card agent is associated with a business card of a provider to whom electronic mail is to be sent to or to whom electronic mail is received from by the messaging application, and in response thereto implementing the agent software routine to control how the electronic mail is communicated.

2. The communication control software routine of claim 1 wherein the characteristics of the card provider include one or more fax numbers and/or E-mail addresses and the agent software routine automatically selects one of the fax numbers or E-mail addresses for the control means, the selection being made according to time or date that electronic mail is to be sent to the particular provider.

3. The communication control software routine of claim 2 wherein the control means includes means for permitting the user to override the automatic selection of one of the fax numbers or E-mail addresses.

4. The communication control software routine of claim 1 wherein the agent software routine comprises a private encryption routine and the control means encrypts each message to the particular provider using the private encryption routine prior to transmission via the messaging application.

5. The communication control software routine of claim 1 wherein the agent software routine comprises a private decryption routine and the control means decrypts each message from the particular provider using the private decryption routine after receipt from the messaging application.

6. The communication control software routine of claim 1 wherein the agent software routine selects time of day or date that electronic mail is to be sent to the particular provider.

7. The communication control software routine of claim 1 wherein the characteristics of the card provider include a network address for the particular provider and the agent software routine is adapted to automatically retrieve available information from the network address.

8. The communication control software routine of claim 7 wherein the control means implements the agent software routine to retrieve the select information form the network address when communication is initiated by the messaging application.

9. The communication control software routine of claim 8 wherein the select information is stored in the business card.

10. The communication control software routine of claim 1 wherein the agent software routine further includes a user display control panel accessible by select other software applications in the user communication device and the control means implements the agent software routine using the display control panel to control communication of electronic mail from the other software applications.

11. The communication control software routine of claim 10 wherein the display control panel comprises a display menu to be filled in by the user and then transmitted to the card provider.

12. A method of controlling the receipt or transmission of electronic mail using a user communication device having a processor and associated memory, the processor controlling a display and a user input device, and a communications terminal for transmitting and receiving electronic mail, the method comprising the steps of:

storing a phone application in the memory of the communication device;

associating with the phone application a business card database storing plural business cards, each business card identifying characteristics of a particular card provider whom electronic mail is to be sent to or received from, one or more of the business cards including an associated business card agent defined by an agent software routine controlling how electronic mail is communicated between the user and the particular provider;

initiating communications to transmit or receive electronic mail; and determining if a business card agent is associated with a business card of a provider to whom electronic mail is to be sent or to whom electronic mail is received from, and in response thereto implementing the agent software routine to control how the electronic mail is communicated.

13. The method of claim 12 wherein the characteristics of the card provider include one or more fax numbers and/or E-mail addresses and further comprising the step of automatically selecting one of the fax numbers or E-mail addresses, the selection being made according to time or date that electronic mail is to be sent to the particular provider.

14. The method of claim 13 further comprising the step of permitting the user to override the automatic selection of one of the fax numbers or E-mail addresses.

15. The method of claim 12 wherein the agent software routine comprises a private encryption routine and further comprising the step of encrypting each message to the particular provider using the private encryption routine prior to transmission of the electronic mail.

16. The method of claim 12 wherein the agent software routine comprises a private decryption routine and further comprising the step of decrypting each message from the particular provider using the private decryption routine after receipt of the electronic mail.

17. The method of claim 12 wherein the agent software routine specifies time of day or date that electronic mail is to be sent to the particular provider.

18. The method of claim 12 wherein the characteristics of the card provider include a network address for the particular provider and the agent software routine is adapted to automatically retrieve available information from the network address.

19. The method of claim 18 comprising the step of implementing the agent software routine to retrieve the select information form the network address when communication is initiated.

20. The method of claim 19 wherein the select information is stored in the business card.

21. The method of claim 12 wherein the agent software routine further includes a user display control panel accessible by select other software applications in the user communication device and further comprising the step of implementing the agent software routine using the display control panel to control communication of electronic mail from the other software applications.

22. The method of claim 21 wherein the display control panel comprises a display menu to be filled in by the user and then transmitted to the card provider.

* * * * *